(No Model.)
C. C. EPP.
GATE.
No. 402,728. Patented May 7, 1889.
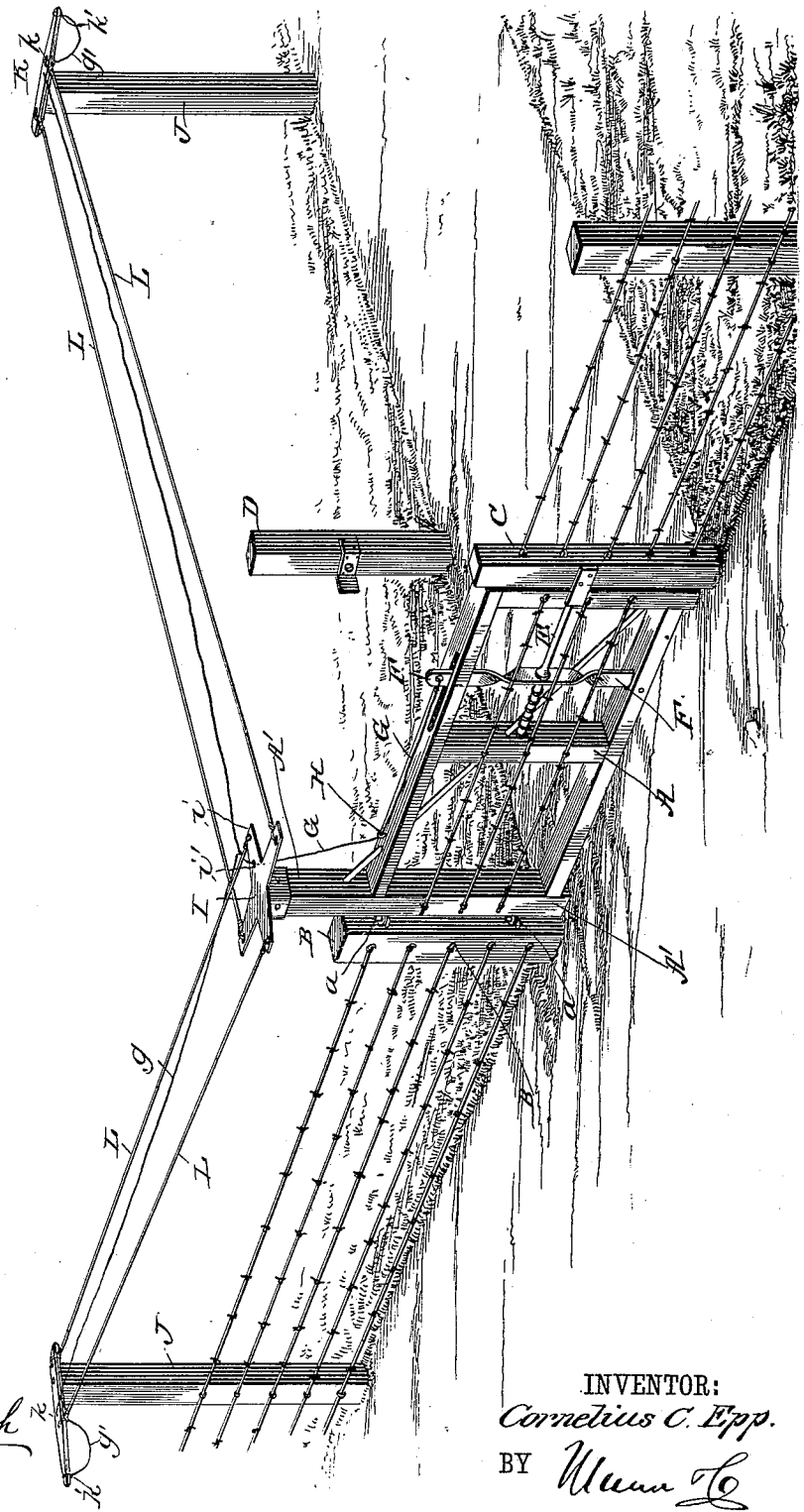
WITNESSES:
Fred G. Dieterich
P. B. Turpin
INVENTOR:
Cornelius C. Epp.
BY
ATTORNEYS.

UNITED STATES PATENT OFFICE.

CORNELIUS C. EPP, OF BRADSHAW, NEBRASKA.

GATE.

SPECIFICATION forming part of Letters Patent No. 402,728, dated May 7, 1889.

Application filed February 13, 1889. Serial No. 299,782. (No model.)

*To all whom it may concern:*

Be it known that I, CORNELIUS C. EPP, of Bradshaw, in the county of York and State of Nebraska, have invented a new and useful Improvement in Gates, of which the following is a specification.

My invention is an improvement in gates; and it consists in certain features of construction and combinations of parts, as will be hereinafter described and claimed.

In the drawing the figure is a perspective view of a gate provided with my improvements.

The gate proper, A, is hinged at $a$ to post B, and moves to and between the latch-post C and the stop-post D, both of which have catch-plates for engagement by the latch E of the gate A, which latch is spring-actuated and is connected with a lever, F, by the rearward movement of which the latch may be drawn out of engagement with the latch-plate.

To operate the latch, I connect the cord G at one end with the upper end of the lever F, pass such cord through a guide, H, on the gate between the lever F and the hinged end of such gate, thence through a guide, $i'$, provided on the main or cross-shaped lever I, and then connect cord G with branches $g$, which connect with the hand-levers, in the manner more fully described hereinafter.

Posts J, or other suitable supports, are arranged a short distance from the hinge-post of the gate. On the posts J, I pivot between their ends the hand-levers K, to which on opposite sides of their pivots are connected rods L. At their opposite ends the rods L are connected with the arms of the cross-shaped lever in such manner that the turning of such levers K on their pivots will effect a turning of the gate to open or close the latter, as may be desired. The cross-shaped lever I is fixed rigidly on the upper end of the rear upright, $A'$, of the gate proper, as shown, and has its arm $i$ provided with an opening forming the guide $i'$ for the cord G. The cord G, as shown, passes from the guide H through the guide $i'$, and then connects with two branches, $g$, which extend to the hand-levers K, and are carried through openings $k$ therein, and are secured at $k'$ to said levers, usually at the handle ends thereof. By this construction I provide a loop or portion, $g'$, of the cord between the points $k$ and $k'$, which may be conveniently grasped by the hand and drawn upon to release the latch, after which, by turning the hand-lever, the gate may be opened, as desired. The loop $g'$ may be utilized as a hand-hold in operating the hand-levers, as will be seen from the drawing. It will also be seen that the cord G is connected at one end with the latch by means of the latch-lever, as before described.

Having thus described my invention, what I claim as new is—

1. In a gate, substantially as described, the combination of the gate proper provided with a latch, the hand-levers having openings $k$, the main lever, connections between said hand and main levers and the latch-operating cord, and branches $g$, passed through openings $k$ in and secured at $k'$ to the hand-levers, forming hand holds or loops, substantially as set forth.

2. In a gate, the combination of the gate proper, the latch, the latch-lever, the main or cross-shaped lever having its arm $i$ provided with the opening $i'$, the latch-cord G, connected at one end to the latch-lever and carried through the guide-opening $i'$, the hand-levers, connections between said hand-levers and the main lever, and branch cords connecting the hand-levers with the cord G, all substantially as and for the purpose specified.

CORNELIUS C. EPP.

Witnesses:
T. M. SHALLENBERGER,
J. F. L. TIEDUE.